United States Patent [19]

Yoshida et al.

[11] Patent Number: 5,573,691
[45] Date of Patent: Nov. 12, 1996

[54] COMPUTERIZED COOKING DEVICE

[75] Inventors: Shinji Yoshida; Yasumasa Hironaka; Akinori Okazaki, all of Osaka, Japan

[73] Assignee: Funai Electric Co., Ltd., Osaka, Japan

[21] Appl. No.: 455,066

[22] Filed: May 31, 1995

[30] Foreign Application Priority Data

Jun. 1, 1994 [JP] Japan .................................. 6-140727

[51] Int. Cl.⁶ ..................................... H05B 1/02
[52] U.S. Cl. .......................... 219/506; 219/492; 219/702; 99/325
[58] Field of Search ..................... 219/492, 506, 219/497, 715–720; 364/477; 99/325

[56] References Cited

U.S. PATENT DOCUMENTS

4,467,164  8/1984  Nakata et al. .................. 219/10.55 B
4,517,429  5/1985  Horinouchi ..................... 219/10.55 B
5,426,280  6/1995  Smith ............................... 219/506

*Primary Examiner*—Mark H. Paschall
*Attorney, Agent, or Firm*—Lackenbach Siegel Marzullo Aronson and Greenspan, P.C.

[57] ABSTRACT

Cooking device which requires a lesser amount of data for preparation of a menu necessary to be pre-memorized and which can use a memory having a small capacity. The cooking device (breadmaking device) is provided with a transformation means which transforms a menu number set by a menu set means to the binary digit data having a fixed bit length, and a control data preparation means in which a cord which is able to show the transformed binary digit data by a fixed bit number when the above binary digit data is divided to each fixed bit number, is allowed to correspond to a parameter level of a step control variable, and the above data is read out from the data table which memorizes the data of each step corresponding to the above parameter level based upon the above code and transforms the above read-out data to the control data.

3 Claims, 10 Drawing Sheets

| MENU NUMBER | TRANSFORMATION DATA |
|---|---|
| 0 0 | 4 3 1 (H) |
| 0 1 | 2 3 1 (H) |
| 0 2 | 4 9 9 (H) |
| 9 9 | 4 8 A (H) |

TRANSFORMATION TABLE
TBL 1

FIGURE 4

PARAMETER LEVEL | DATA (MIN.)
---|---
00 | 05
01 | 10
10 | 15
11 | 20

1st MIX STEP (50Hz) TBL2

PARAMETER LEVEL | DATA (MIN.)
---|---
00 | 06
01 | 12
10 | 18
11 | 24

1st MIX STEP (60Hz) TBL3

FIGURE 5

PARAMETER LEVEL | DATA (MIN.)
---|---
00 | 05
01 | 10
10 | 60
11 | 70

1st FERM STEP TBL4

FIGURE 6

PARAMETER LEVEL | DATA (MIN.)
---|---
00 | 16
01 | 20
10 | 24
11 | 30

2nd MIX STEP (50Hz) TBL5

PARAMETER LEVEL | DATA (MIN.)
---|---
00 | 20
01 | 24
10 | 28
11 | 36

2nd MIX STEP (60Hz) TBL6

FIGURE 7

FINAL PROOF STEP TBL7

| PARAMETER LEVEL | DATA (MIN.) |
|---|---|
| 0 0 | 40 |
| 0 1 | 50 |
| 1 0 | 60 |
| 1 1 | 70 |

FIGURE 8

BAKING STEP TBL8

| PARAMETER LEVEL | DATA(°C) |
|---|---|
| 0 0 | 120 |
| 0 1 | 150 |
| 1 0 | 200 |
| 1 1 | — |

FIGURE 9

BAKING CONTROL STEP TBL9

| PARAMETER LEVEL | DATA(°C) |
|---|---|
| 0 0 | 96 |
| 0 1 | 99 |
| 1 0 | 102 |
| 1 1 | — |

PARAMETER LEVEL

| | 1st MIX | 1st FERM | 2nd MIX | 2nd FERM | ROUND | FINAL PROOF | BAKING | BAKING COTROL | COOLING |
|---|---|---|---|---|---|---|---|---|---|
| ① | 5 (min.) | 5 (min.) | 16 (min.) | 20 (min.) | 2(sec) | 40 (min.) | 120 (°C) | 96 (°C) | 15 (min.) |
| ② | 10 | 10 | 20 | (FIXED) | | 50 | 150 | 99 | |
| ③ | 15 | 60 | 24 | | | 60 | 200 | 102 | |
| ④ | 20 | 70 | 30 | | | 70 | | | |

COMPUTERIZED COOKING DEVICE

BACKGROUND OF THE INVENTION

This invention relates to add computerized cooking device. More particularly, it relates to a computerized cooking device in which a small memory capacity can be used by decreasing an amount of data which should be stored in advance for programming cooking cycles for the operation of the device.

Figure 12:
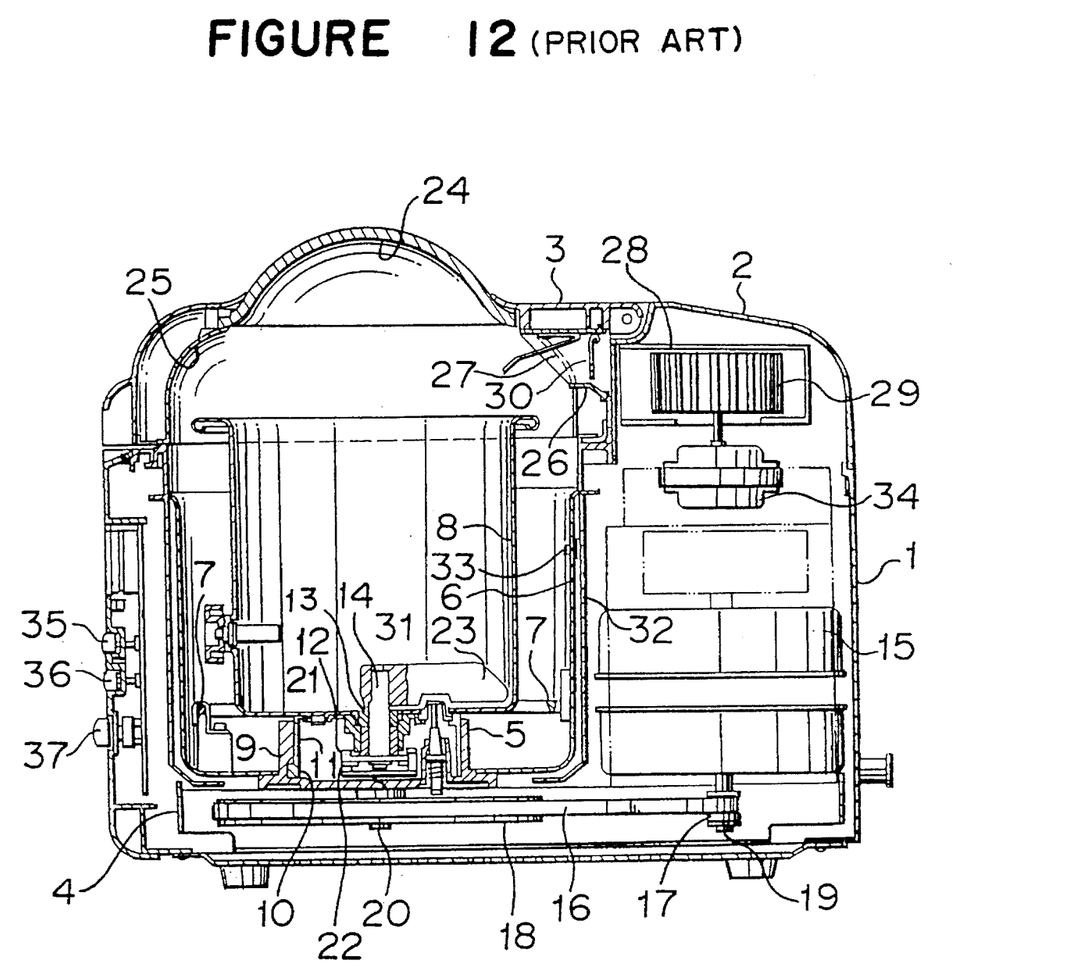
FIG. 12 is a sectional view of a known breadmaking device.

In an exemplary embodiment of the prior art as shown in section in FIG. 12, in a conventional computerized cooking device, numeral 1 is a main body, 2 is an upper port case, 3 is a lid able to open and close freely, 4 is a stand frame, 5 is a bearing plate, 6 is an inner case, 7 is an oven heater, 8 is a bread baking case, 9 and 10 are a couple of latching pieces, and 11 is a stand plate.

In addition, 12 is a bearing portion, 13 is a metal, 14 is an upper part of a rotational axis, 15 is an agitation motor, 16 is a belt, 17, 18 are pulleys, 19 is an output axis of the agitation motor 15, 20 is a lower part of rotational axis, 21 and 22 are clutch bodies and 23 is an agitation blade.

The numeral 24 is a glass window, 25 is a heat reflection plate, 26 is an air intake guide, 27 is an air intake hole, 28 is a blast guide, 29 is a blast fan, 30 is a counter-flow prevention plate, 31 is a dough sensor, 32 is an adiabatic body, 33 is an oven sensor fixed at the inner case 6, 34 is a blast motor, 35, 36 are menu selection buttons, and 37 is a start button.

Figure 13:
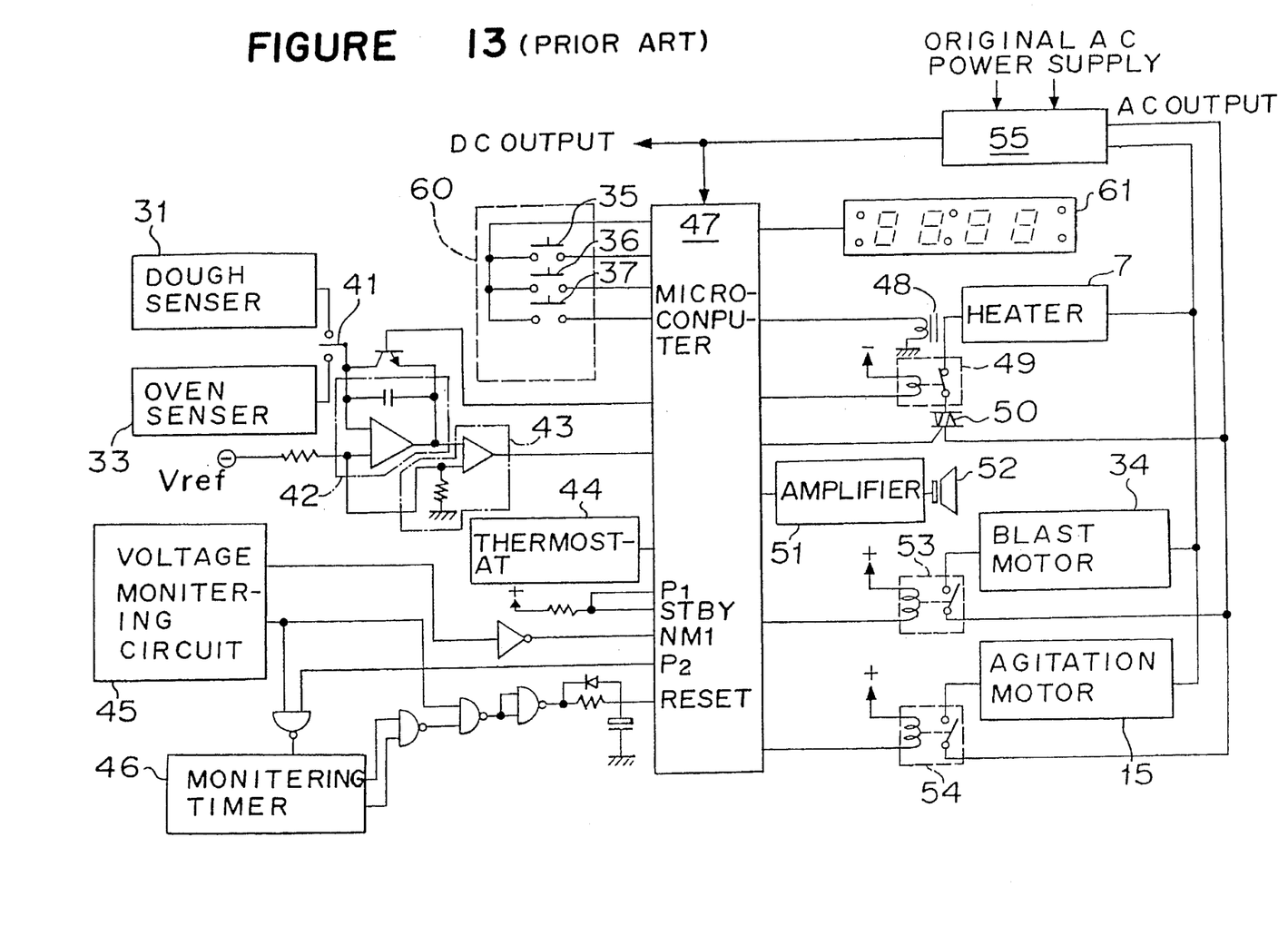
FIG. 13 is an electric circuit diagram which shows a configuration of the electric circuit in the breadmaking device shown in FIG. 12.

FIG. 13 is an electric circuit diagram which shows a configuration of the electric circuit in the bread making device shown in FIG. 12, and the same reference numerals are used as in FIG. 12.

In FIG. 13, 41 is a switch for switching from the dough sensor 31 to the oven sensor 33, 42 is an integrator, 43 is a comparison circuit, 44 is a thermostat, 45 is a voltage monitoring circuit, 46 is a momentary stop monitoring timer and 47 is a microcomputer.

The microcomputer 47 consists of RAM (random access memory), ROM (read only memory), I/O (input/output) port, and an A/D (analog to digital) converter. In said ROM, control programs for breadmaking cycles are stored. 48 is a transformer for feeding back a heater current of the oven heater, 49 is a relay circuit for on/off of the heater current of the oven heater 7, and 50 is a triac (triode AC semiconductor switch) for controlling the heater current of the oven heater.

The numeral 51 is an amplification circuit, 52 is a speaker which gives an alarm. The numeral 53 is a relay circuit for the controlling blast motor controlling controlling which controls the on/off state of the blast motor 34 and 54 is a relay circuit for controlling the blast motor which controls the on/off state of the agitation motor 35.

The numeral 55 is a power supply circuits of the bread making device which supplies an AC power to the oven heater 7, the blast motor 34 and the agitation motor 15, as well as converting original AC power to DC power for the control circuits.

The numeral 60 is an input means on which an operating panel, a menu selection button 35 to select a menu and a cooking program setting button 36, as well as a start button 37 to start the operation of the breadmaking device are installed. The numeral 61 is an indicator which indicates a selected menu.

In the present specification, "the menu selection" means to select a kind of food to be cooked and conditions under which the food should be cooked in accordance with a certain sequence program stored within the device, and "the sequence program" means a program of operation of the device consisting of cooking steps in required turns and parameters of time, temperature and cooking power.

Figure 14:
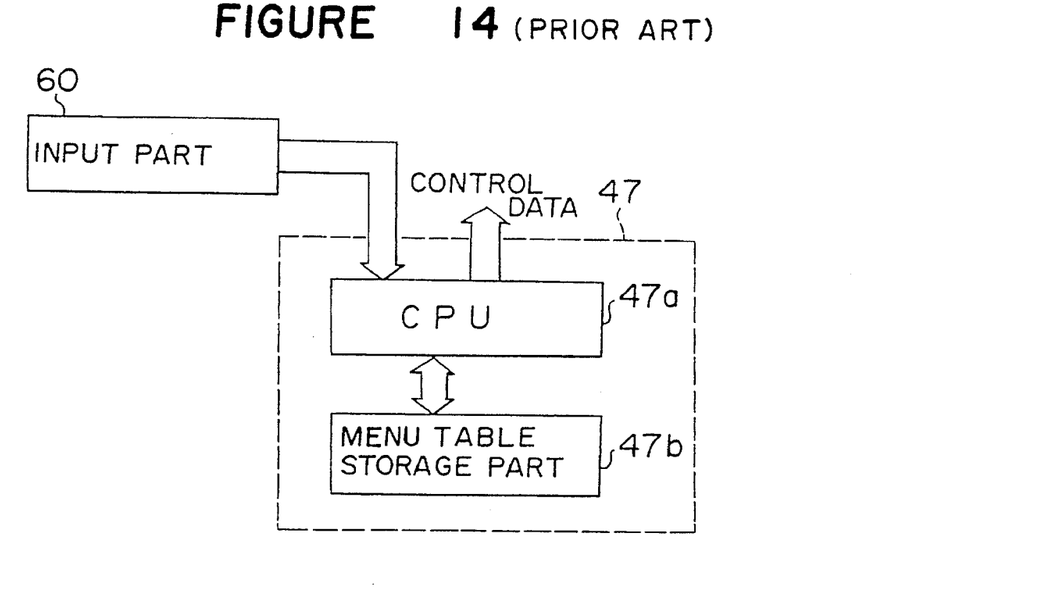
FIG. 14 is a functional block diagram of a data processing microcomputer of the conventional breadmaking device shown in FIGS. 12 and 13.

FIG. 14 is the block diagram which shows a data processing function, consisting of a microcomputer 47 of the breadmaking device. In FIG. 13 and FIG. 14, the same reference numerals are used for common parts. The numeral 47a is a CPU (central processing unit), and 47b is a menu table storage part or memory.

The operation of the device is next explained as follows.

In this breadmaking device, sequence programs for cooking varieties of foods and preferences of cooking conditions are previously incorporated in ROM of the microcomputer 47. Accordingly, when a menu is selected by pushing the menu selection button 35, cooking conditions are designated by pressing the cooking program setting button, and the start button 37 is pushed, the above sequence program is read out in order. The time and temperature parameters are allocated to the bread making process in the following order, and the cooking process proceeds: a 1st Mixing→Aging Stage→2nd Mixing→1st Fermentation, 2nd Fermentation→Rounding Stage→Final Proof→Baking→Baking Control→Cooling. In this case, with respect to the final proofing stage, a previously fixed time, for 60 minutes, is set in the above sequence program.

Figure 15:
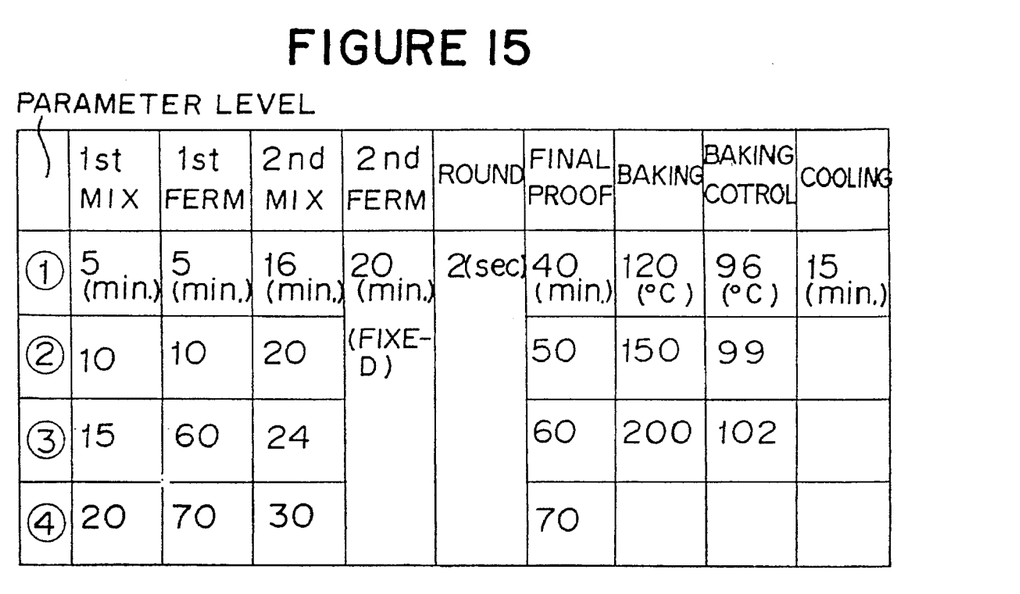
FIG. 15 is a table which shows standards of control variable in each step such as time, temperature and the like in each step used by the sequential program of the breadmaking device.

FIG. 15 lists various parameter levels in which different parameters of time and temperature are combined at each step for sequence programs of working. As shown therein, these parameter levels include 3 kinds of levels such as 4 parameter levels of ①②③④, 3 parameter levels of ①②③ and other fixed parameter levels according to the steps.

It is possible to program many kinds of menus for various courses of cooking, according to a sequence program by combining each step of the parameter levels. For instance, about 100 kinds of menus can be made and these 100 kinds of menus make sequence programs of each menu by the following combination:

"1st mix time" is 5 minutes, the same as in step parameter level ①→Aging Stage→2nd Mixing time is 20 minutes the same as in step parameter level ②→1st Fermentation, and 2nd Fermentation time are the same as 5 minutes in step parameter level ① and 20 minutes of step fixed parameter level ②→Rounding time is 2 seconds the same as in step fixed parameter level→Final Proof time is 70 minutes the same as in step parameter level ④, Baking and Baking Control are 120° C. the same as in step parameter level ① and 102° C. in step parameter level ③, respectively,→ cooking time is 15 minutes the same as in step fixing parameter level.

Thus, the time and temperature parameters are combined respectively according to the kinds of menus of the above 100 kinds. These are stored in a menu table storage part 47b in the ROM as the sequence program for each menu, respectively.

Since at least 18 bytes are necessary for each menu, if there are 100 kinds of menus, the memory capacity of the menu table storage part 47b must be approximately 2 K bytes. If more numbers of menus are desired, the capacity of the memory should be increased proportionally.

Since the conventional cooking device has mechanisms as explained above, all of the sequence programs consisting of combined time and temperature parameters for the kinds of menus have to be stored in the menu table storage area 47b in the ROM, and accordingly, the amount of memory data becomes a large quantity, and a large capacity of data memory was necessary.

This invention has been made to resolve such problems and its object is to provide a computerized cooking device in which a memory bank having a smaller memory capacity can be used by converting the necessary decimal data into binary digit data which includes data for entire series of cooking steps, because there is no need to previously store all of the sequence programs corresponding to every type of cooking menu.

BRIEF DESCRIPTION OF THE INVENTION

The present invention is to provide a computerized cooking device, in which a control circuit means automatically programs a sequence program to cook a selected menu of food, consisting of required cycles of steps and appropriate and select parameters including time and temperature at each step. The control circuit means includes:

a menu inputting means into which menu numbers are input by predetermined digits with key pads;

a conversion means which converts the input menu numbers to the binary digit data in a predetermined bit length including information of each step for cooking a food selected by the menu input means; and a control data preparing means for running each step when the above binary digital data having fixed bit length converted by the above conversion means are divided into each predetermined bit number, each of these divided binary digit data allowed to correspond to a plurality of cords able to represent by predetermined bit number respectively whereby the control data for running each step by the above data table based upon a table data which memorizes a relation between a parameter level of each step and control data for running the corresponding steps (parameter each step) and the above parameter level corresponds to the cord being read by the binary digit data with reference to the above conversion means.

In addition, the cooking device of this invention is characterized by transforming the data to said menu number corresponding to the menu selected by the menu selection button thereby inputting it to the above menu input means.

In the cooking device of this invention, when a menu number is entered in predetermined decimal digits by touching pads of key input means, the menu number is transformed to binary digit data by a previously prepared conversion table which converts decimal digits into binary digits containing a sequence program to carry out a desired cycle of operation, as well as necessary time and heating temperature of each step or cycle. The binary digit data is divided into predetermined bit numbers corresponding to each step of the breadmaking process and each step is given a particular variable parameter level in a form of a plurality of cords capable of indicating in divided binary digits. Accordingly, it is possible to read out required cycle of operation for running the operation, to supplement non-variable steps and to program an entire control data to process a food as that of the entered menu number.

Further, in the above description, the input into the menu input means is selected, while watching an indicator which indicates the menu by menu selection button whereby the menu can transform to a corresponding menu number to input by pushing a menu setting button to the desired menu.

DETAILED DESCRIPTION OF THE INVENTION

Figure 1:
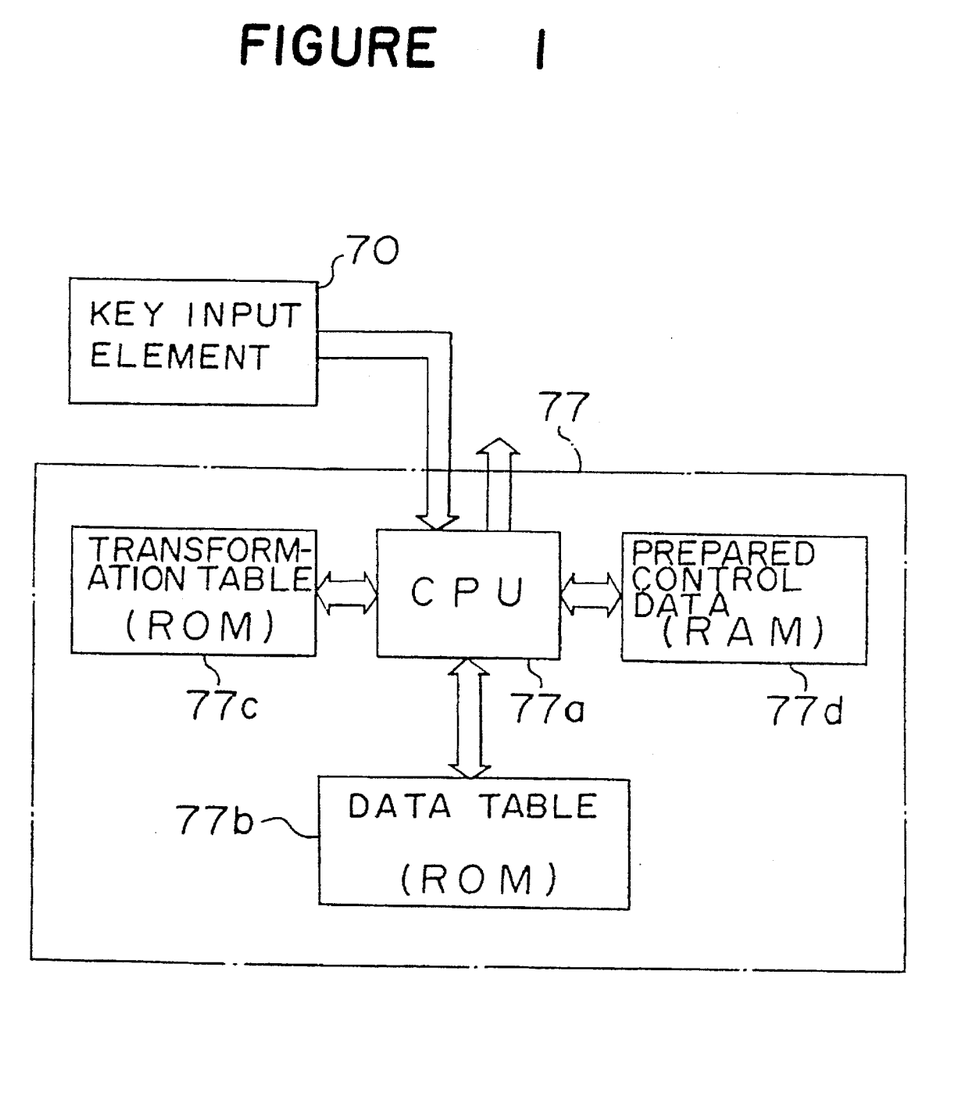
FIG. 1 is a function block diagram, which shows a data processing function of a microcomputer in case of a bread making device of this invention.

An embodiment of a cooking device of this invention will be described with reference to the accompanying drawings. In this case, a cooking device is shown by an embodiment of a breadmaking device. FIG. 1 is a functional block diagram which shows a data processing function of a microcomputer 77 of a breadmaking device of this invention. In FIG. 1, 70 is a key input element, 77a is a CPU portion, 77b is a ROM of data table storage, 77c is a ROM of a transformation table storage, and 77d is a RAM of prepared control data storage. In addition, the configuration of the electric circuit of the breadmaking device in this embodiment is approximately the same as that of FIG. 13 except for the input element 60 and the memory of the microcomputer 47. In this embodiment, the key input element 70 is connected in place of the input element 60 in FIG.

13, and the microcomputer 77 is used in place of the microcomputer 47. Accordingly, in this embodiment, its appearance is approximately the same except that the key element 70 of FIG. 1 is connected in place of the menu selection button 35 in FIGS. 12 and 13. FIG. 1, a decimal number having two digits, i.e., "00" to "99", is input according to a selected menu from the key input element 70.

In other words, in this embodiment, 100 different menus from 0 to 99 can be entered. At the indication portion 61 shown in FIG. 13, decimal digit menu numbers from "00" to "99" are indicated according to the kinds of menus selected. Further, the kinds of menus can be input by the conventional menu selection button 35 and menu setting button 36 in place of this key input portion 70. In this case, the indication is input to indicate by being transformed to the menu number corresponding to the above menu.

Figure 2:
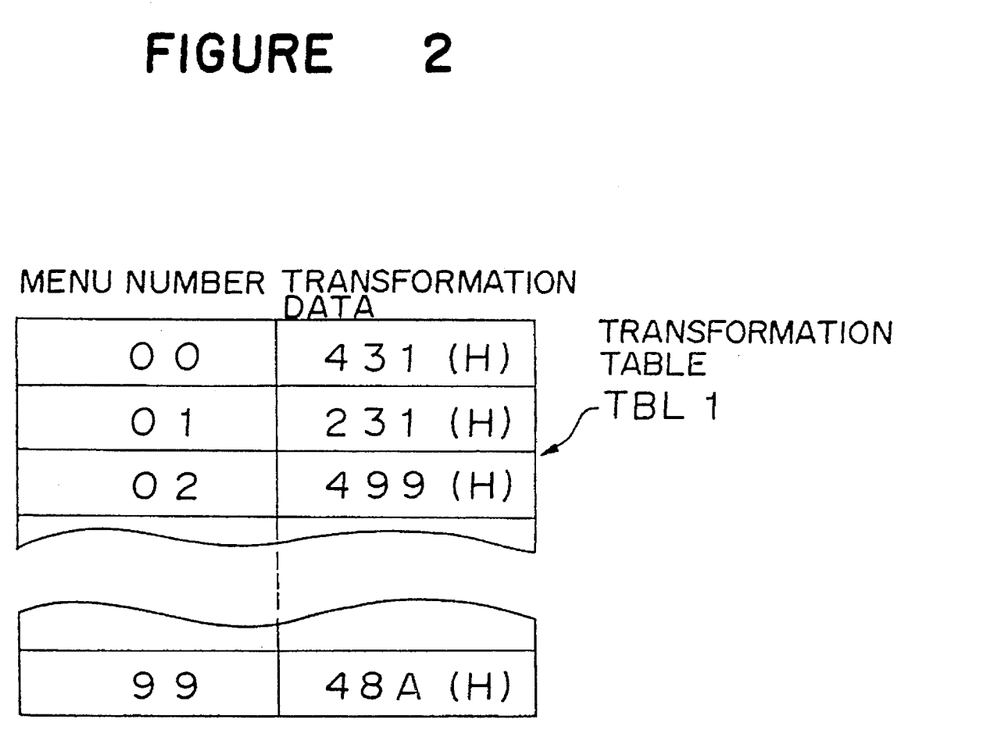
FIG. 2 is an explanatory transformation table of a breadmaking device of this invention.

In the transformation table 77c, are there is stored the date shown in the transformation table TBL1 shown in FIG. 2 which includes menu numbers from "00" to "99" corresponding to 100 kinds of menus from 0 to 99 and parameter level information at each step for preparation of the menu corresponding to the above menu numbers, said information being transformed to 12 figures or the binary digit data of 12 bits (shown in FIG. 3 by hexadecimal digit) so as to be capable of input.

Furthermore, in the data table 77b, the data tables TBL2–TBL9 are stored as shown in FIG. 4–FIG. 9, in which four parameter level control data of the step control variables are transformed to two figure binary digit with regard to the steps of 1st mixing, 2nd mixing, fermentation, final proof, baking and cooking.

Figure 10:
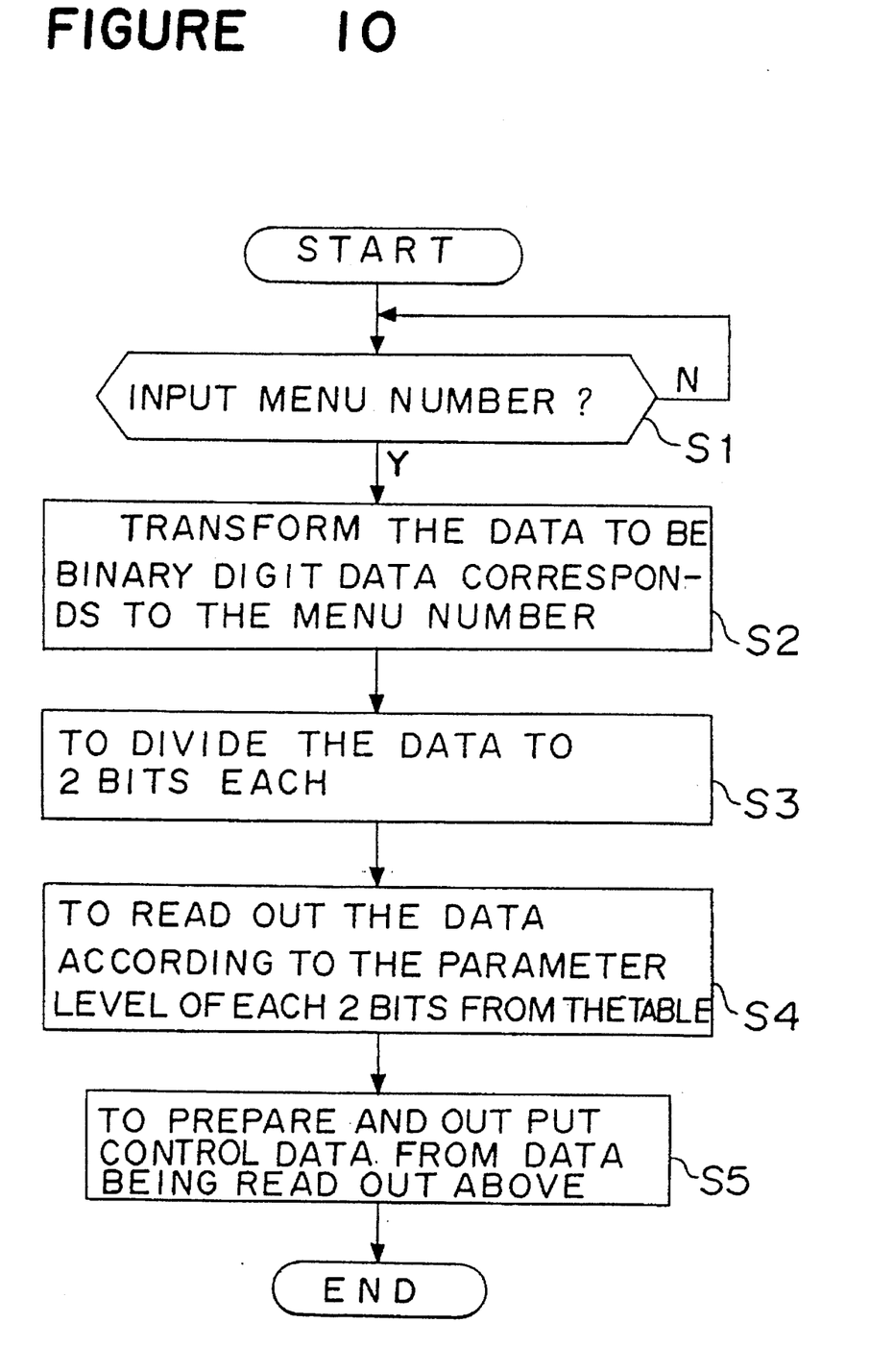
FIG. 10 is a flow chart which shows activities of a sequential program of a selected menu in the breadmaking device of an embodiment of the cooking device in this invention.

FIG. 10 is a flow chart which shows the flow of data processing when the sequential program corresponds to the menu selected by the breadmaking device of this embodiment is prepared and stored in RAM 77d as control data.

Figure 3:
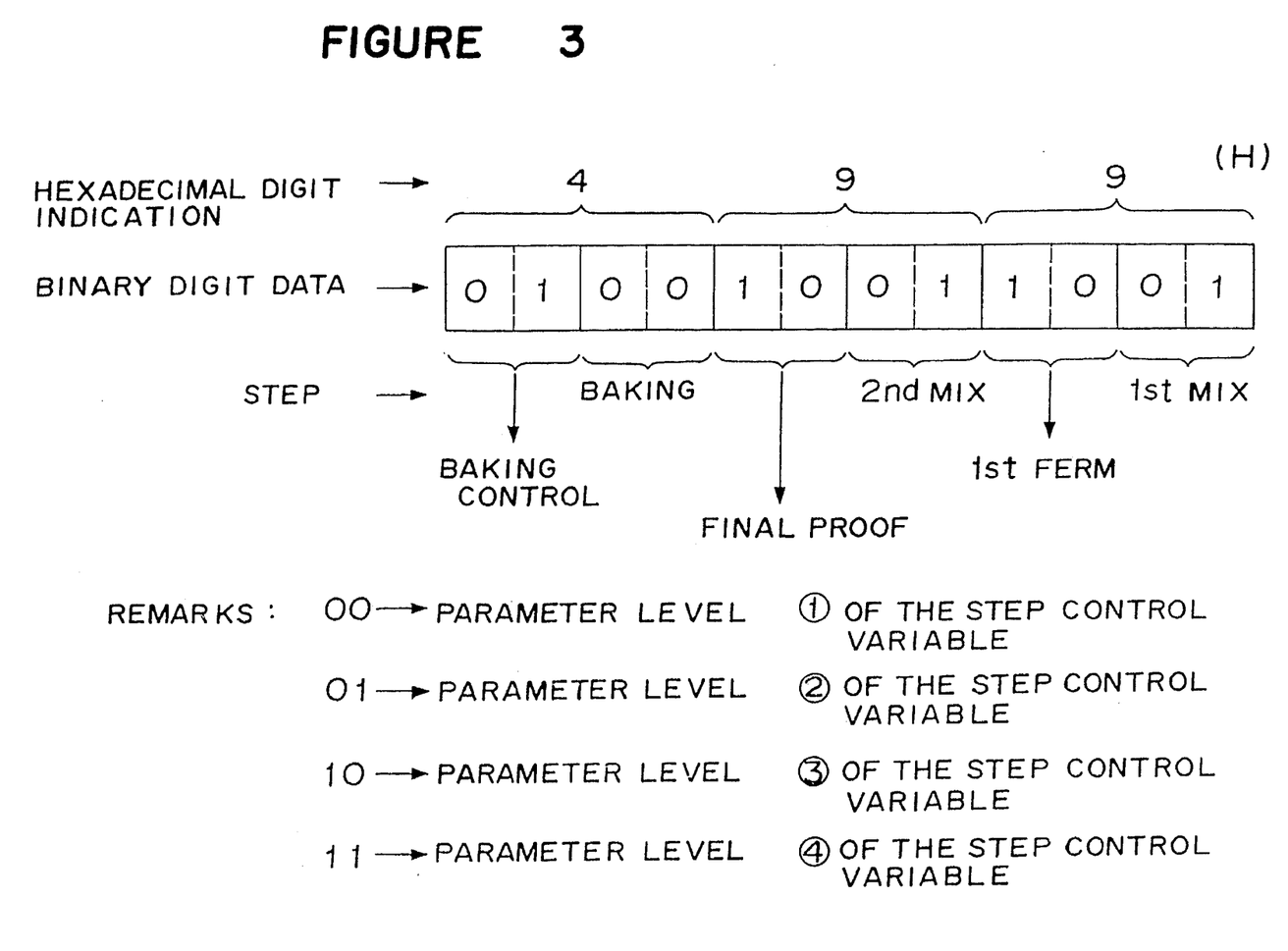
FIG. 3 is a format diagram when an input menu number is transformed to the binary digit data of 16 bits of the breadmaking device in this invention.

The data processing will be explained below by using this flow chart. First, whether or not the menu selection is performed is confirmed by checking whether the decimal digit data from "00" to "99" is entered on the key input element 70 (step S1). When confirmed "yes", the corresponding binary digit data is read out with reference to the transformation table TBL1 in the decimal digit menu number according to the selected menu (FIG. 2 is shown in hexadecimal digit) (step S2). In this case, it means that the menu "02" is selected and "499H" is read out by hexadecimal digit indication from transformation table TBL1. When this hexadecimal digit data "499H" is represented by the binary digit data, the binary digit data shown in FIG. 3 is obtained. Each figure of the binary digit rank, like in FIG. 3, is previously decided to show data of parameter level at each step by dividing the sequence of bits to each 2 bits from the bottom figure and to show each step of 1st mixing, fermentation, 2nd mixing, final fermentation, baking and baking control.

Accordingly, these data are taken out every 2 bits from a lower rank and are divided into each step (Step 3). In this case, 2 bits of each low rankshow "1st mixing step", the next 2 bits show "1st fermentation step", the next 2 bits show "2nd mixing step", the next 2 bits show "final proof", the next 2 bits show "baking step", and the next 2 bits show "baking control". In each data content of each 2 bits taken out, the step "00" represents parameter level ① of the step control variable, "01" represents parameter level ② of the step control variable, "10" represents parameter level ③ of the step control variable, and "11" represents parameter level ④ of the step control variable, respectively.

Accordingly, the data "01" taken out at first from each low rank 2 bits represents a data of parameter level ② of the step control variable in "1st mixing", the data "10" of the parameter level ③ of the step control variable in "1st fermentation", the next data "01" taken out in 2 bits represents a data of parameter level ② of the step control variable in "2nd mixing", the next data "10" taken out in 2 bits represents a data of parameter level ③ of the step control variable in "final proof", the next data "00" taken out in 2 bits represents a data of parameter level ① of the step control variable in "baking", and the next data "01" in 2 bits taken out represents a data of parameter level ② of "baking control". The step data can be read by these 2 bits of data with reference to each step data table TBL2 to TBL9 (Step S4).

In other words, with reference to the step data table TBL2 from the first taken out value data "01", the data of parameter level ② of the step control variable in "1st mixing step", "10 minutes" is read out and stored in the preparation control data 77d. Then, the "data 60 min" of the parameter level ③ of the step control variable in "1st fermentation" is read by a data "10" with reference to step data table TBL4 and is stored in the preparation data 77d. Then, the data "20 minutes" of parameter level ② of the step of control variable in the "2nd mixing" is read by data "01" with reference to step data table TBL5 and stored in the preparation control data 77d. Then, the data "60 minutes" of the parameter level ③ of the step control variables in "final proof" is read by data "10" with reference to the step data table TBL7 and stored in the preparation control data 77d. Further, according to the taken out value data "00", the data "120° C." of the parameter level ① of the step control variables in "baking step" is read by a data "00" with reference to the data table TBL8 and is stored in the preparation control data 77d. Furthermore, the data "99° C." of the parameter level ② of the step control variables in "baking control" is read by a data "01" with reference to the data table TBL9 and stored in preparation control data 77d.

Figure 11:
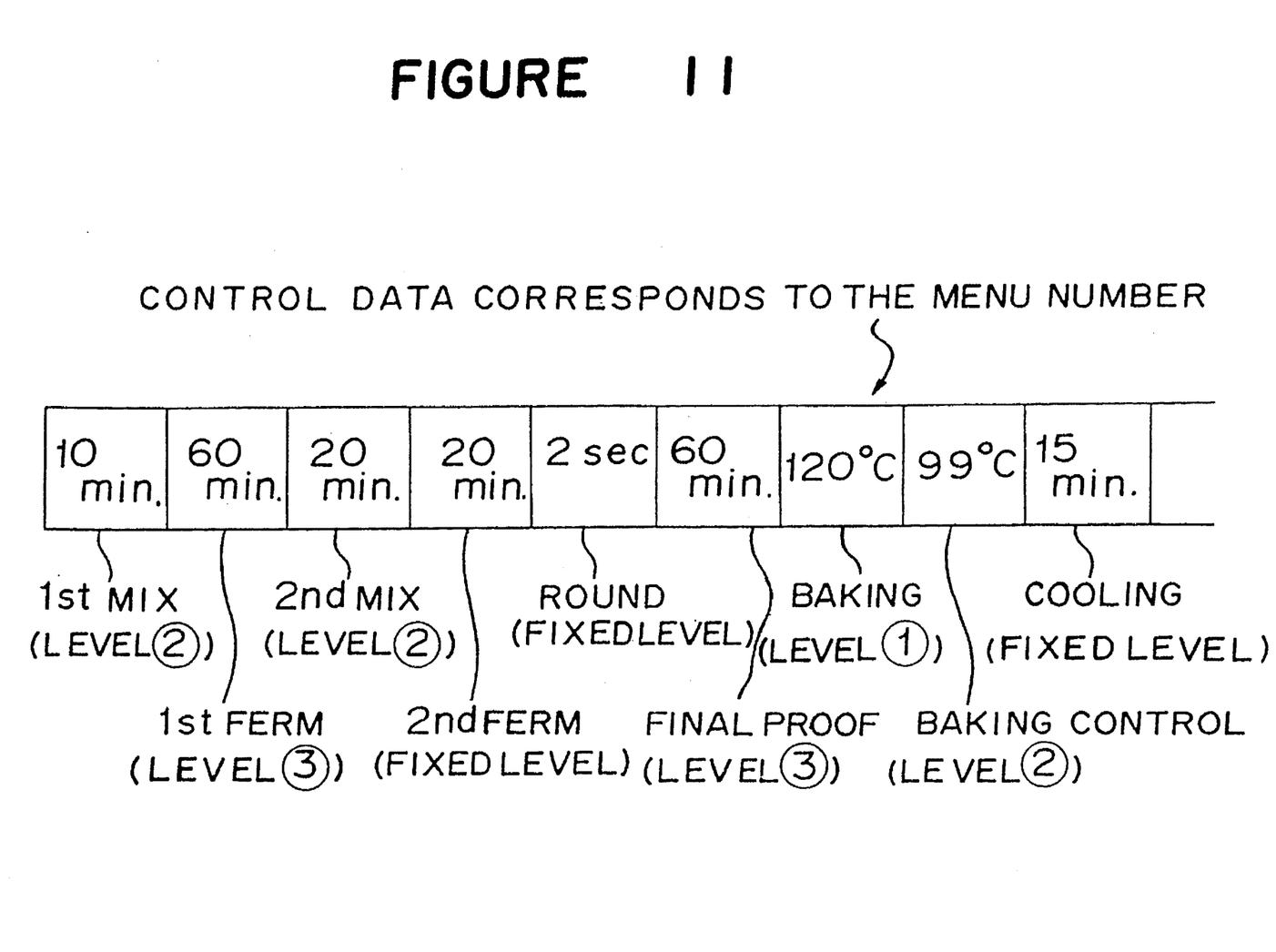
FIG. 11 is a sequential program prepared for running the desired operation of the device to cook a selected menu in the breadmaking device of an embodiment of the cooking device in this invention.

A control data as shown in FIG. 11 can be prepared by combining the corresponding standard data at each step as shown in the above and fixed parameter level data in the preparation control data 77, and is output (Step S5).

Figure 4:
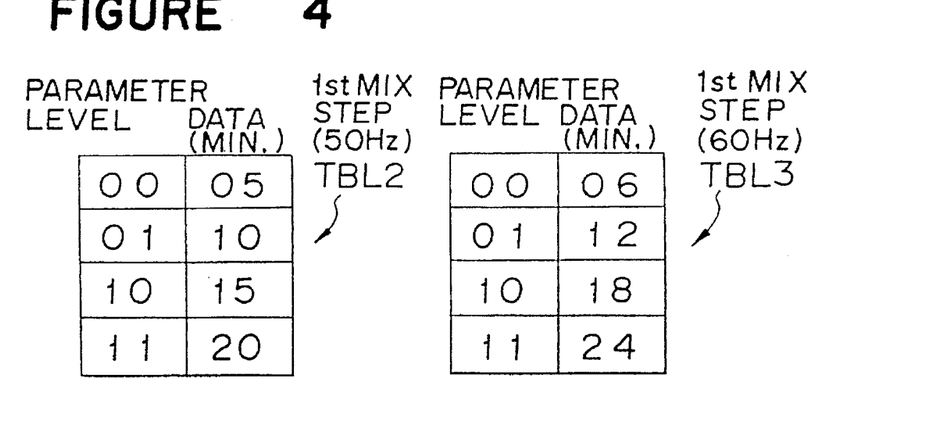
FIG. 4 (TBL2 and TBL3) is an explanatory step data table of breadmaking device of this invention.
Figure 5:
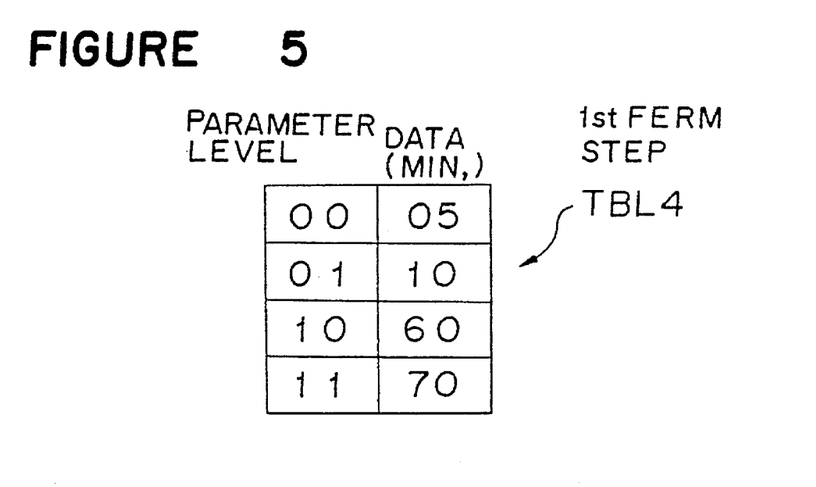
FIG. 5 (TBL4) is an explanatory step data table of a breadmaking device of the cooking device in this invention.
Figure 6:
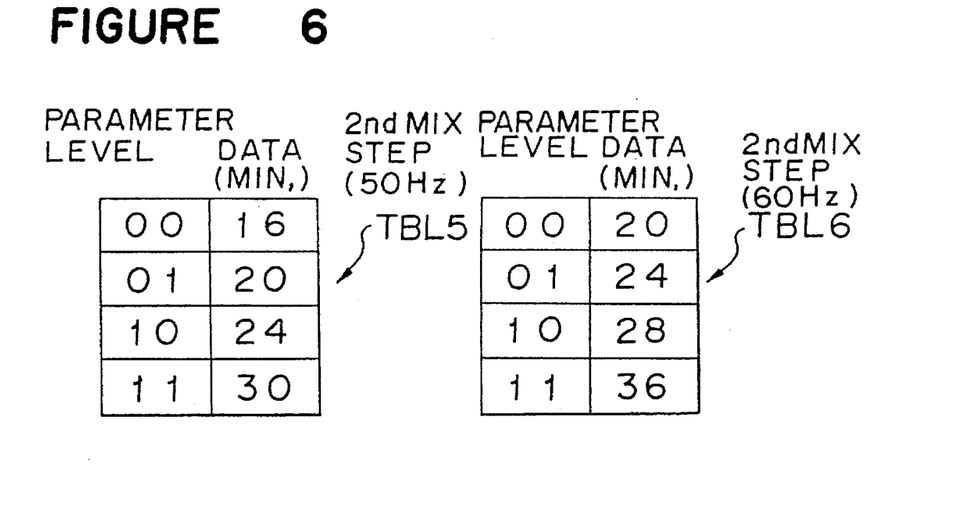
FIG. 6 (TBL5 and TBL6) is an explanatory step data table of the breadmaking device in an embodiment of the cooking device of this invention.
Figure 7:
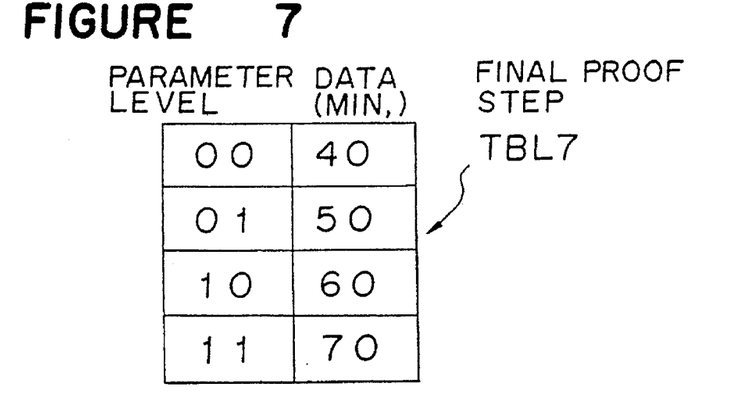
FIG. 7 (TBL7) is an explanatory step data table of the breadmaking device of an embodiment of the cooking device of this invention.
Figure 8:
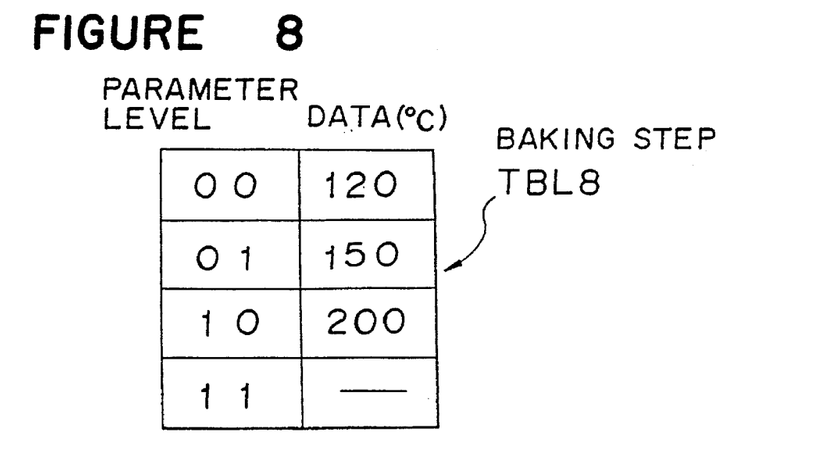
FIG. 8 (TBL8) is an explanatory step data table of the breadmaking device in an embodiment of the cooking device in this invention.
Figure 9:
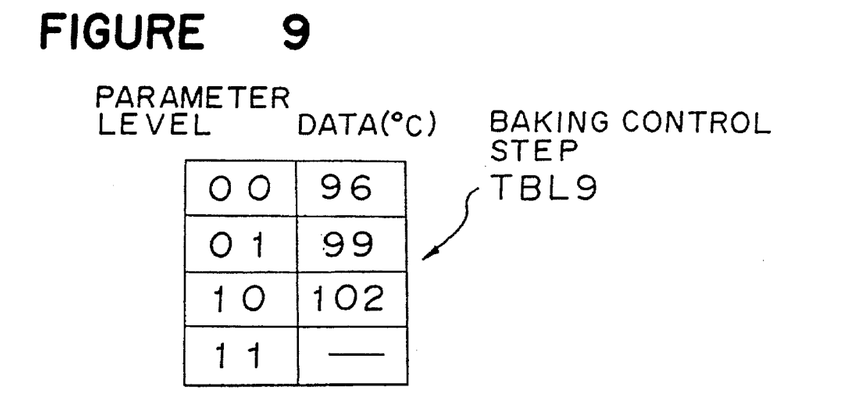
FIG. 9 (TBL9) is an explanatory step data table of the breadmaking device in an embodiment of the cooking device in this invention.

The data table TBL3 in the 1st mixing step and the data table TBL6 in the 2nd mixing step are the step data tables corresponding to 60 Hz area in the power source frequency.

In other words, TBL2 and TBL5 are substituted by TBL3 and TLB6 in the 60 Hz area, respectively.

According to the present invention, the required amount of memory capacity can be decreased to about one eighth (⅛) of the prior art method, only approximately 254 bytes in total is the necessary memory capacity, including 200 bytes for the transformation table 77C, 36 bytes for the data table 77b and 18 bytes for the preparation control data 77d, and an additional amount for the data table storage, as well as only 8 bytes for 50/60 Hz. These figures are much smaller than the conventional required memory capacity of 2 K bytes.

The above example is a case when the menu numbers are 100, and the more the menu number increases, the necessary memory capacity becomes larger in proportion to the menu numbers in the prior art technology. In this invention, on the other hand, the necessary memory capacity of the data table 77b and the preparation control data 77d does not increase, even when the menu number increases, and the transformation table 77c increases as the menu number increases. However, since its increasing byte number is smaller when compared with that of the conventional one, the difference between both becomes larger.

Accordingly, the required data to be previously stored in this embodiment are a transformation table TBL1, data tables TBL2 to TBL9 of each step, and programs for control data preparation process. This can remarkably decrease the amount of data to be stored, while all possible sequential programs of menu have to be previously stored in the conventional breadmaking device.

According to this invention described above, the amount of data of each step of kinds of menus in the cooking device to be memorized, and the memory capacity can also be made smaller.

In addition, since a large amount of menu data is storable, even if there exist differences in material quality and operation environment, a menu for performing a normal cooking can be input and even if a wrong cooking due to the length of each step is performed, the normal cooking can be performed by instructing the menu number to users.

What is claimed is:

1. A computerized control for a cooking device provided with a control circuit means for automatically programming a sequence of programmed steps to cook a selected menu of food, consisting of required cycles of steps and selectable parameters including time and heating temperature at each step, said circuit control means comprising: a CPU for performing digital processing; a conversion means connected to said CPU for converting an inputted menu number to binary digit data having a predetermined bit length including information representing each step for cooking a food selected by the menu input means; and memory means connected to said CPU for storing table data which establishes a relationship between a parameter level of each step and control data for running the corresponding steps and the parameter level corresponds to the code being read by the binary digit data with reference to said conversion means; a control data preparation means connected to said CPU for executing each step when the above binary digit data having fixed bit length is converted by the above conversion means are grouped into a predetermined number of bytes each including a fixed bit number, each Of these binary digit data bytes corresponding to a plurality of codes which represent selectable parameters, whereby the control data is used for executing each step by said data table.

2. A computerized control for a cooking device provided with a control circuit which inputs one menu number selected from among "n" kinds of menus after placing cooking ingredients into the cooking device, then proceeds with "m" cooking steps, after establishing cooking conditions such as required cooking time and heating temperature, against every step of said "m" steps, for obtaining foods corresponding to said selected menu number, the control comprising: a CPU for performing digital processing; a menu input means for inputting a selected menu number to said CPU; transforming means connected to said CPU for providing a transformation table storing $2^a$ x m transformation data which comprises "m" groups of bits and "a" bits in each group corresponding to said menu number input by said menu input means; data storage means for storing and providing m step data tables, each table of said m tables storing $2^a$ cooking parameters or conditions for each control data, the computerized control performing said cooking steps according to said cooking conditions selectively called from said step data tables, which tables are indicated by transformation data output from said transformation table, and wherein n is substantially greater than $2^a$.

3. A method of controlling a cooking device provided for automatically programming a sequence of programmed steps to cook a selected menu of food, consisting of required cycles of steps and selectable parameters including time and heating temperature at each step, the method comprising the steps of converting an inputted menu number to binary digit data having a predetermined bit length including information representing each step for cooking a food in accordance with a selected menu; storing table data which establishes a relationship between a parameter level of each step and control data for running the corresponding steps an the above parameter level corresponds to the code being read by the binary digit data executing each step by means of a CPU when the above binary digit data having fixed bit length is grouped into a predetermined number of bytes each including a fixed bit number, each of these binary digit data bytes corresponding to a plurality of codes which represent selectable parameters, whereby the control data is used for executing each step by said data table.

\* \* \* \* \*